Nov. 22, 1927. Re. 16,790

C. F. JENKINS

TWO-WAY OSCILLATING MIRROR

Original Filed Oct. 20, 1922 2 Sheets-Sheet 1

INVENTOR.
CHARLES FRANCIS JENKINS
BY Paul Carpenter
ATTORNEY.

Nov. 22, 1927. Re. 16,790

C. F. JENKINS

TWO-WAY OSCILLATING MIRROR

Original Filed Oct. 20, 1922 2 Sheets-Sheet 2

INVENTOR.
CHARLES FRANCIS JENKINS.
BY
ATTORNEY.

Reissued Nov. 22, 1927. Re. 16,790

UNITED STATES PATENT OFFICE.

CHARLES FRANCIS JENKINS, OF WASHINGTON, DISTRICT OF COLUMBIA, ASSIGNOR TO JENKINS LABORATORIES, OF WASHINGTON, DISTRICT OF COLUMBIA, A CORPORATION.

TWO-WAY OSCILLATING MIRROR.

Original No. 1,537,087, dated May 12, 1925, Serial No. 595,819, filed October 20, 1922. Application for reissue filed April 13, 1927. Serial No. 183,572.

This invention relates to apparatus for broadcasting pictures, and its principal object is a mechanism for causing a light beam to travel across a picture surface from side to side and from top to bottom.

Figure 1:
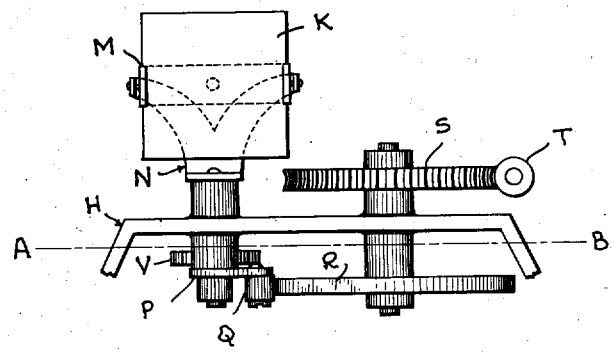
Figure 2:
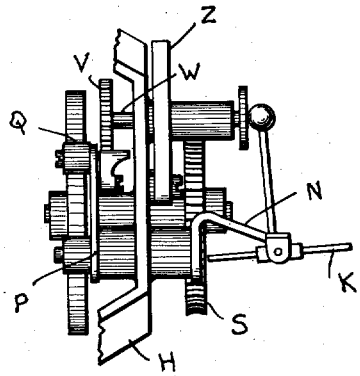
Figure 3:
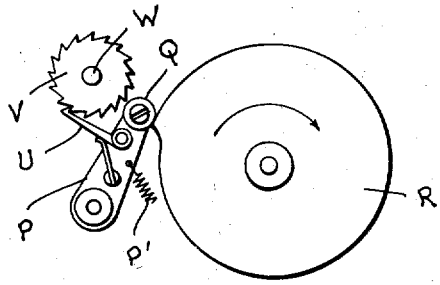
Figure 4:
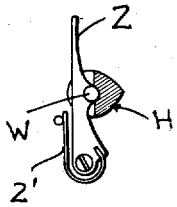
Figure 5:
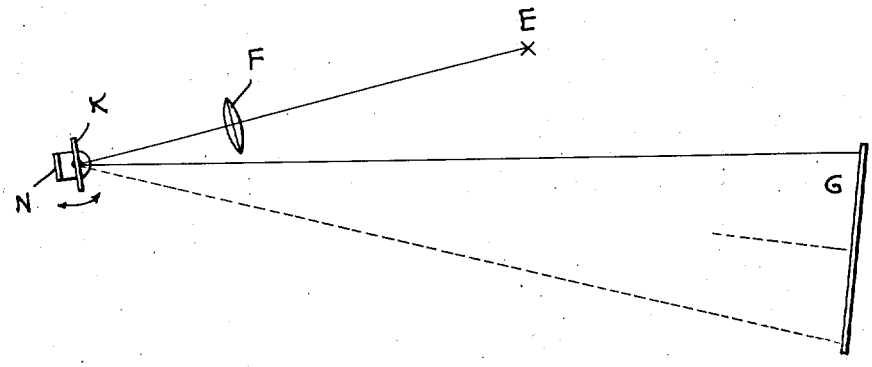
Figure 6:
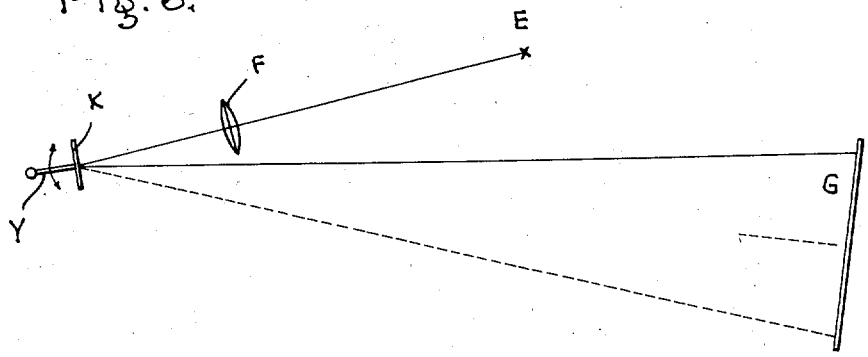

In the drawings Fig. 1 is an elevation; Fig. 2 an elevation viewed from a position at right angles to the view in Fig. 1; Fig. 3 is a view looking down from the line A—B of Fig. 1; Fig. 4 a detail; Figs. 5 and 6 diagrams showing how used.

In the figures like symbols refer to like parts, H being a main frame; K a mirror; M a clamp for holding the mirror; N a frame in which the mirror clamp is pivoted. The forked frame N is mounted to oscillate freely in the main frame H by means of the arm P, upon the other end of which latter a roller Q is supported. This roller bears against the cam R which rotates in the main frame, and is driven by the gear S and the worm T, the worm T being mounted and rotated in any suitable manner, for example, on the shaft end of an electric motor (not shown). The arm P has mounted thereon a pawl U which engages the ratchet V on a threaded shaft W rotated in the main frame, and upon which a disc head X is also mounted. This disc X has resting thereon the ball-end of an arm Y, the other end of which is fixedly attached to the mirror holder M. An arm Z bears against the threaded shaft W, held thereagainst by the spring Z′ (Fig. 4), and as the arm Z is also threaded where it encircles (for half its circumference) the shaft W, the latter will rise when the ratchet V is rotated.

In Figs. 5 and 6 E is a source of light; F a lens for imaging the light source on the picture surface G, after reflection in the mirror K, the angle of the light oscillation lying between the solid line and the dotted line.

The object sought is to cause a beam of light reflected from the surface of the mirror to move in two directions in order that it will cover the whole of a picture surface, as is illustrated in Figs. 5 and 6, and this is accomplished by giving the mirror K a vibration or oscillation in two directions, in one direction many times oftener than in the other direction. The oscillation of the mirror in the frequent direction is illustrated in Fig. 5 and in the single oscillation direction in Fig. 6. It is accomplished in the following described manner.

The rotation of the cam R in the direction of the arrow (Fig. 3) gives the arm P an oscillation once for each turn of the cam and with an amplitude equal to the difference between the maximum and minimum radius of the cam. As the mirror holder is attached to the shaft, to which this arm is fastened, obviously the mirror will have a similar movement. Also as the arm P drops back, after passing the high point of the cam, the ratchet V is rotated one notch by reason of the engagement therewith of the pawl U. As the cam rotates, the arm P is pushed out again which causes the pawl to engage a second tooth on the ratchet V. Because the shaft W, to which the pawl is fastened, is threaded, the shaft W with the disc X thereon is raised with each successive oscillation of the arm P and its pawl U. When the shaft W has risen to its highest position, the arm Z may be withdrawn and the shaft W lowered to its lowest position by pressing down on the disc X while the arm Z is held out of engagement with the threaded shaft W (Fig. 4).

Vibration of the mirror in the plane illustrated in Fig. 5 is that caused by the rotation of the cam R, and is, therefore, the multiple vibration; the single vibration being illustrated in Fig. 6. The number of times the beam of light crosses the picture surface from left to right while the threaded shaft W travels the distance necessary to cover the picture surface once from top to bottom is a matter of choice of thread.

It is to be noted that the action of cam R is such that, in oscillating mirror K, the mirror is rotated in one direction at substantially a constant rate through a definite angle, and is returned to its initial position very quickly by spring P′. Thus, substantially the entire period of oscillation is required for the mirror to traverse the picture surface in one direction, and the return movement is effected in the remaining time of the period. With such an arrangement it is apparent that there is no necessity to make provisions for cutting off the light during the return movement as in arrangements employing freely oscillating mirrors, in which the return movement requires the same time as the traversing movement. Due to the fact that the mirror is effective in scanning the picture surface for substantially the entire period of oscillation, applicant's arrangement permits greater scanning speeds and increased light efficiency.

What I claim is:

1. In a mechanism for oscillating a mirror, the combination of a screw for giving the mirror an oscillation in one plane, and a cam for simultaneously giving the mirror a plurality of oscillations in a plane at right angles to the first plane.

2. In a mechanism for oscillating a mirror, the combination of a screw for giving the mirror an oscillation in one plane, a cam for simultaneously giving the mirror a plurality of oscillations in a plane at right angles to the first plane, and means for returning the mirror to its initial position at will.

3. In a mechanism of the class described, a light source, a mirror, a lens located to direct light from the source onto the mirror, a screw for giving the mirror an oscillation in one plane, and a cam for simultaneously giving the mirror a plurality of oscillations in a plane at right angles to the first plane.

4. The combination of a mirror, means to oscillate the mirror about a given axis, and means actuated by said oscillating means to rotate said mirror through a definite angle about a different axis for each oscillation about the first axis.

5. The combination of a mirror, means to oscillate the mirror about a given axis, said means being designed to cause said mirror to rotate in one direction for substantially the entire period of oscillation and to return in the remaining time of the period, and means for simultaneously rotating said mirror about a second axis.

6. The combination of a mirror, means to cause said mirror to periodically rotate through a given angle at substantially a uniform rate about a given axis and to return to its initial position at a much higher rate, and means for simultaneously rotating said mirror about a second axis.

CHARLES FRANCIS JENKINS.